May 26, 1953  D. R. DORY  2,639,454
PUSHER FOR ICE AND SNOW
Filed Dec. 8, 1950
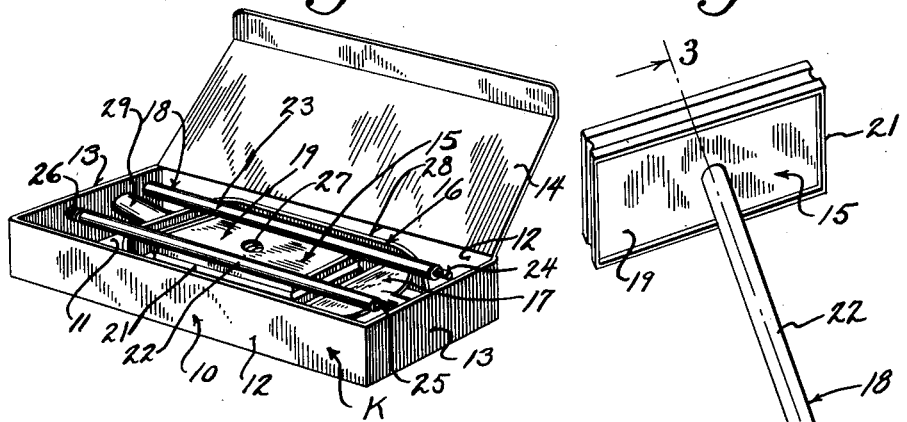
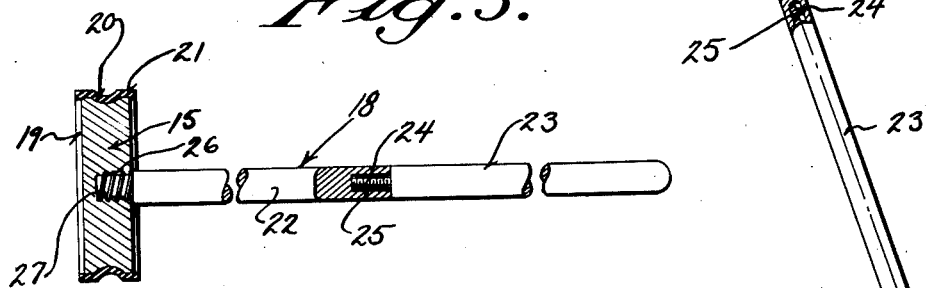
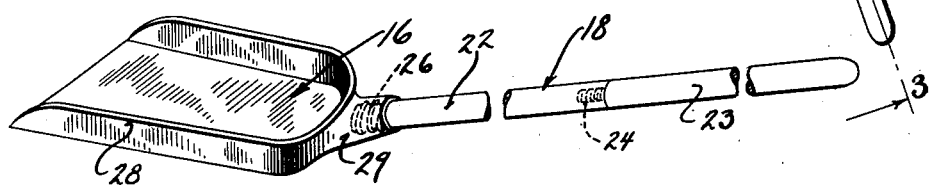
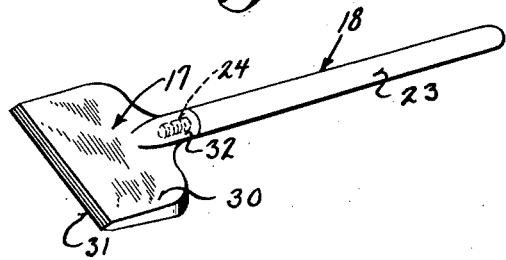
INVENTOR
DANIEL R. DORY
BY
ATTORNEYS

Patented May 26, 1953

2,639,454

UNITED STATES PATENT OFFICE 2,639,454

PUSHER FOR ICE AND SNOW

Daniel R. Dory, Milwaukee, Wis.

Application December 8, 1950, Serial No. 199,732

1 Claim. (Cl. 15—245)

This invention appertains to motor vehicle appliances, and more particularly to a novel winter kit for use by motorists during snowy and icy weather.

During the winter season, motorists experience much difficulty in removing snow from the bodies of their automobiles and snow and ice from off of the windshield and window glass. Likewise, it often becomes necessary to remove snow from in front of the wheels of an automobile.

It is, therefore, one of the primary objects of my invention to provide a single, compact kit for motorists, having special tools therein for, 1, removing snow from the automobile body; 2, removing ice and snow from the windshield and window glass, and 3, for removing snow from in front of the wheels of the automobile.

Another prime object of the invention is to provide a single demountable and sectional handle for selective use with any one of the desired tools.

A further important object of my invention is to provide a novel implement or tool for pushing snow off of the top and sides of an automobile, embodying a solid wood or like block for receiving the handle, and an elastic band of rubber for encompassing the edges of the block for effectively preventing injury to the paint or finish of the body.

A still further object of my invention is to provide a novel winter kit for motorists, of the above character, which will be durable and efficient in use, one that will be simple and easy to manufacture, and one which can be placed upon the market at a reasonable cost and one which will occupy a minimum amount of space in an automobile.

With these and other objects in view, the invention consists in the novel construction, arrangement and formation of parts, as will be hereinafter more specifically described and claimed and illustrated in the accompanying drawing, in which drawing, Figure 1 is a perspective view of my improved winter kit showing the various implements packed within a container.

Figure 2 is a perspective view of the novel tool for pushing snow off of an automobile body, parts of the figure being shown broken away and in section to illustrate structural details.

Figure 3 is a side elevational view of the snow pusher, with parts thereof in section, the parts in section being taken on the line 3—3 of Figure 2, looking in the direction of the arrows.

Figure 4 is a perspective view showing my shovel for removing snow in front of the wheels of an automobile.

Figure 5 is a perspective view showing the scraper for removing snow and ice from the windshield and window glass.

Referring to the drawing in detail, wherein similar reference characters designate corresponding parts throughout the several views, the letter K generally indicates the winter kit and the same embodies a sturdy box or container 10 for compactly receiving winter implements, as will be later set forth.

The container or box 10, can be formed from wood, or cardboard as shown, and includes a bottom wall 11, side walls 12, end walls 13 and a top hinged cover 14. A strap, not shown, can be utilized to go around the box or container for holding the cover in its closed position and to facilitate the carrying of the kit when necessary.

In accordance with my invention, I employ in my kit, a snow pusher 15, a shovel 16 and an ice and snow scraper 17 for window glass. These three implements are so designed relative to one another that the same will fit compactly within the box or container 10. A single sectional handle 18 is utilized for the three implements, as will be later described.

Referring to the snow pusher 15, the same preferably includes a solid wood or like block 19, having a groove 20 formed around its side edges. An elastic band 21 of rubber or the like, is sprung around the side edges of the head or block 19, and the width of this band is such, that the same protrudes slightly beyond the front and rear faces of the block or head. The band is of a desirable thickness, so as to form a cushion to effectively prevent injury to the finish of an automobile body when the implement is used for pushing snow off of the same. In conjunction with the head or block 19, I utilize the handle 18. This handle can be made of wood, and includes a front section 22 and a rear section 23, detachably connected together to permit the quick connection or disconnection of the sections. As illustrated, the section 23 is provided with a threaded stud 24, for reception in a threaded socket 25 formed in the section 22. The forward end of the section 22 of the handle has wound thereabout, a wire 26 which forms a coarse thread and the block or head 19 is provided with a threaded socket 27, so that the handle can be threaded therein.

In use of my pusher, the handle sections 22 and 23 are assembled and the handle is threaded into the socket 27. The pusher can now be effectively used for pushing snow off of the roof of an auotomobile, the hood, trunk, etc., and as the band 21 will form an effective cushion, injury to the vehicle is prevented.

The shovel 16 includes a blade 28, and the rear end of the blade is provided with a socket 29 for receiving the forward end of the section 22 of the handle 18. Hence, by connecting the handle 18 to the shovel, an effective implement can be quickly provided for removing snow in front of the wheels of an automobile.

The ice scraper 17, includes a flat blade 30 having a sharpened forward edge 31 and this blade is preferably molded from a suitable plastic material. The rear end of the blade is provided with a central socket 32 for the reception of the threaded extension or stud 24 on the handle section 23.

The shovel blade 28, the block or head 19 and the ice scraper 17, are so designed and proportioned that the block or head 19, and the ice scraper 17 can be placed within the shovel blade 28, as is clearly shown in Figure 1 of the drawing. The sectional handle can be placed on top of the shovel blade, as illustrated, or at the sides thereof.

The section 23 of the handle gives an adequate hand grip for the use of the ice scraper, and in some instances, the ice scraper can be used alone, without the handle section 23.

From the foregoing description, it can be seen that I have provided a novel winter kit which will effectively aid a motorist in freeing an automobile of ice and snow during winter weather.

Changes in details may be made without departing from the spirit or the scope of this invention, but what I claim as new is:

An implement for pushing snow off of the bodies of automobiles comprising a head including a solid block having flat front and rear faces, said rear face being provided with a socket, a handle having its forward end fitted in the socket, the marginal edges of the block having a continuous groove and a flat elastic band fitted around the marginal edges of the block for snug engagement therewith and the walls of the groove, said band projecting slightly beyond the front and rear faces of the block.

DANIEL R. DORY.

References Cited in the file of this patent

UNITED STATES PATENTS

| Number | Name | Date |
|---|---|---|
| 1,334,911 | Lampkin | Mar. 23, 1920 |
| 1,750,845 | Lach | Mar. 18, 1930 |